US006649281B2

(12) United States Patent
Henderson

(10) Patent No.: US 6,649,281 B2
(45) Date of Patent: Nov. 18, 2003

(54) VOLTAGE VARIABLE METAL/DIELECTRIC COMPOSITE STRUCTURE

(75) Inventor: William H. Henderson, Redondo Beach, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/107,874

(22) Filed: Mar. 27, 2002

(65) Prior Publication Data

US 2003/0186033 A1 Oct. 2, 2003

(51) Int. Cl.[7] .......................... H01G 5/00; B32B 15/00

(52) U.S. Cl. ....................... 428/632; 428/642; 428/336; 428/469; 428/697; 428/699; 428/701; 428/702; 428/446; 361/277

(58) Field of Search ................................ 428/469, 689, 428/697, 699, 701, 702, 446, 642, 632, 336; 257/295, 298, 312; 361/277; 438/379

(56) References Cited

U.S. PATENT DOCUMENTS

| | | | | | |
|---|---|---|---|---|---|
| 3,569,795 | A | * | 3/1971 | Gikow | 361/434 |
| 5,192,871 | A | * | 3/1993 | Ramakrishnan et al. | 257/595 |
| 5,607,631 | A | * | 3/1997 | Wolfson et al. | 264/138 |
| 6,101,102 | A | * | 8/2000 | Brand et al. | 363/15 |

* cited by examiner

*Primary Examiner*—Deborah Jones
*Assistant Examiner*—Stephen Stein
(74) *Attorney, Agent, or Firm*—Leonard A. Alkov; Glenn H. Lenzen, Jr.

(57) ABSTRACT

A voltage variable composite structure comprising: a first layer of metal; a second layer of low-loss dielectric material impregnated with an array of first metal vias; a third layer of a voltage variable dielectric material; a fourth layer of a patterned thin metallic film; a fifth layer of low-loss dielectric material impregnated with an array of second metal vias; and a sixth layer of metal.

16 Claims, 5 Drawing Sheets

VOLTAGE VARIABLE METAL/DIELECTRIC COMPOSITE STRUCTURE

BACKGROUND OF THE INVENTION

1. Field of Invention:

This invention relates to voltage variable dielectric (VVD) composites. Specifically, the present invention relates to metal/dielectric VVD composites.

2. Description of the Related Art

There are currently two classes of VVD composites. Both involve mixtures of VVD with other dielectric materials. The first is simply a random mixture of VVD with a low loss dielectric. The disadvantages of this structure are the very large dielectric constant (about 100) and large bias voltages (several thousand volts typically) required. The second is the so-called '1–3 composite,' which consists of an array of VVD rods or vias embedded in a dielectric medium. For further information see US Pat. No. 5,607,631. Low dielectric constants can be obtained, in principle, with this method, however there is no reduction in the voltage requirement and there is no proven method of producing the structure.

Use of dielectric/dielectric composites does not allow much design flexibility. It is not possible to tailor current materials for specific applications. For example the dielectric/dielectric composites cannot be designed to have a more effective dielectric tuneability (even over a narrow range of frequency) than the base VVD material.

Hence, a need remains in the art for a VVD composite with low dielectric constant and low bias voltage. Furthermore, this material should be readily producible with established micro machining and film deposition techniques.

SUMMARY OF THE INVENTION

The need in the art is addressed by the voltage variable composite structure of the present invention. This invention comprises:

a) a first layer of metal;

b) a second layer of low-loss dielectric material impregnated with an array of first metal vias:

c) a third layer of a voltage variable dielectric;

d) a fourth layer of metal capacitors;

e) a fifth layer of low-loss dielectric material impregnated with an array of second metal vias; and f) a sixth layer of metal.

The inventive structure comprises a square lattice of unit cells of height H, width W and length L. The low loss dielectric material has a dielectric constant $\in_{substrate}$. The metal vias traverse the entire thickness of the low loss dielectric material. The voltage variable dielectric material has a dielectric constant $\in_{VVD}$ and a thickness T. The capacitors have a width Wid and a gap G.

The first metal via is adjacent the first metal contact and the second metal via is joined to the second metal contact. The dimensions of the structure are selected to produce an effective dielectric constant $\in_{eff}$ whose value is given approximately by the following formulae:

$$\in_{eff}=\in_{substrate}+\text{Cap}*H/(W*L) \quad [1]$$

$$\text{Cap}=\in_{VVD}*\text{Wid}*T/G \quad [2]$$

The invention is preferably produced by first impregnating a low-loss dielectric material with an array of metal vias and coating one surface with a layer of metal. This structure can be cut to produce the second and fifth layers. Then the bottom of the second layer is coated with the layer of voltage variable dielectric material followed by the layer of patterned metallic film. Finally the two subassemblies are connected with the layer of voltage variable dielectric in the middle so that said first metal vias are adjacent to the first metal contacts and the second metal vias connect to the second metal contacts.

The metal can be any good conductor such as copper, gold and silver. The voltage variable dielectric material is about 100 to 1000 nm in thickness and is preferably made from barium strontium titanate. The low loss dielectric material is preferably micromachinable using low cost techniques. Candidates include silicon, gallium arsenide (GaAs), and the photopatternable lithium silicate glass, made by the Japanese company, Hoyo, known as PEG-3.

This invention has low dielectric constant (about 10) and a bias voltage on the order of tens of volts. Furthermore, it is readily producible with established micro machining and film deposition techniques. This invention may be tuned by the application of an electrical voltage. By varying the geometry of the metal microstructures, the composite can be designed to perform in a manner that is optimized for various electronic applications. The principle difference between this composite and previous tunable composite is the incorporation of embedded metal microstructures.

The metal/dielectric composite may be used for a variety electronic phase tuning applications. With suitably low loss materials, it may be employed at frequencies ranging from MHz to several hundred GHz. It may be used for phase tuning in different guided wave structures including rectangular wave guide (single-and multi-mode) and parallel plate. There are a number of methods by which it may be used for electronic beam steering including: (1) as the active element (s) in a scanning feed; and (2) integrated directly into the radiating elements of an antenna. Examples of (2) include continuous transverse stub antennas and dielectric lens antennas.

The principle advantage of voltage variable dielectric based phase shifting devices is low cost. The major obstacles to widespread use of VVD devices are the very high dielectric constant and large bias voltage requirement of these materials (and of current composites incorporating VVDs). The metal/dielectric composite eliminates both of these problems.

The invention can be used for electronic beam steering for radar and communication applications. The main advantage of the technology is that it would provide the beam agility required for applications such as synthetic aperture radar mapping, ground and airborne moving target interrogation, and point to multi-point communication, without the high cost of conventional, transmit/receive (T/R) module based, beam steering techniques. The invention may prove to be particularly important at millimeter wave frequencies (Ka band and above), since T/R module technology is underdeveloped and extremely expensive at these frequencies. Military systems that would benefit from this technology include space-based radar, unmanned aerial vehicles, and radar guided missiles. Commercial applications include point to multi-point communication: both ground-to-ground and ground-to-satellite.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
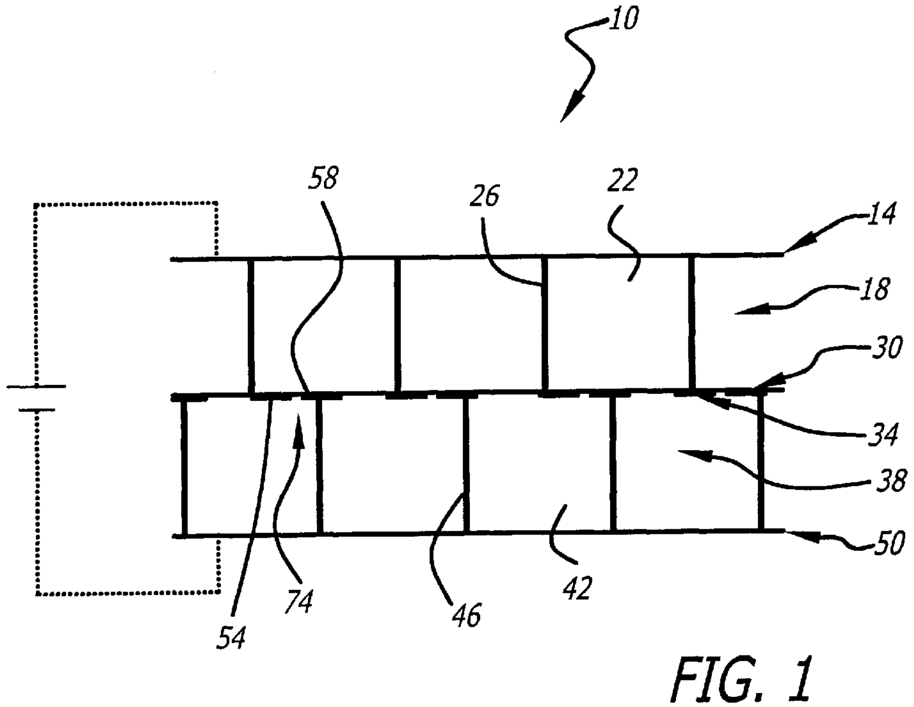
FIG. 1 is a side, elevation view of an illustrative embodiment of a voltage variable metal/dielectric composite structure implemented in accordance with the teachings of the present invention.

FIG. 1 is a side, elevational view of an illustrative embodiment of a voltage variable metal/dielectric composite structure implemented in accordance with the teachings of the present invention. In the illustrative embodiment, the invention 10 comprises 6 layers:

1. A first layer 14 of metal. The metal may be any good conductor, for example copper, gold or silver. The first layer 14 may be formed by electroplating one surface of the second layer 18.
2. A second layer 18 of low-loss dielectric material 22 impregnated with an array of metal vias 26, which preferably traverse the entire thickness of the dielectric 22. The metal vias 26 may be made of any good conductor, for example copper, gold or silver.
3. A third layer 30 (about 100 to 1000 nm in thickness) of a voltage variable dielectric material such as barium-strontium-titanate (BST).
4. A fourth layer 34 of a patterned thin-metallic film deposited onto the voltage variable dielectric material. The pattern forms a lattice of capacitors 74 attached to conductors 54, 58. Again the metal may be any good conductor such as copper, gold or silver. The patterning may be accomplished by conventional metal etching techniques.
5. A fifth layer 38 of low-loss dielectric material 42 impregnated with an array of metal vias 46, which preferably traverse the entire thickness of the dielectric 42. The metal vias 46 may be made of any good conductor, for example copper, gold or silver. The construction of the fifth layer 38 is identical to the construction of the second layer 18.
6. A sixth layer 50 of metal. The metal may be any good conductor, for example copper, gold or silver. The sixth layer 58 may be formed by electroplating one surface of the fifth layer 38.

The first metal vias 26 do not need to be in direct Ohmic contact with the first contacts 54. This is due to the fact that the capacitance between the vias 26 and the contacts 54, is many orders of magnitude greater than the capacitance between the metal contacts 54 and the metal contacts 58. This fact ensures that the applied DC bias voltage will drop across the gap between the metal contacts 54 and 58, and not across the gap between the first vias 26 and the first metal contacts 54. The second metal vias 46 make contact with the second contacts 58 in a staggered relationship (with respect to the first set of vias 26). More details of this relationship will become apparent from the following description.

Intermediate layers may also be included to facilitate manufacturing. For example a “seed” layer consisting of an additional dielectric film may be deposited on the second layer 18 before deposition of the voltage variable dielectric material. For microwave applications, the direction of energy flow would be perpendicular to the plane of the paper in this diagram. To achieve optimal performance, the low-loss dielectric 22, 42 may be a composite of two or more dielectrics, in which case one of these dielectrics may be air.

Figure 2:
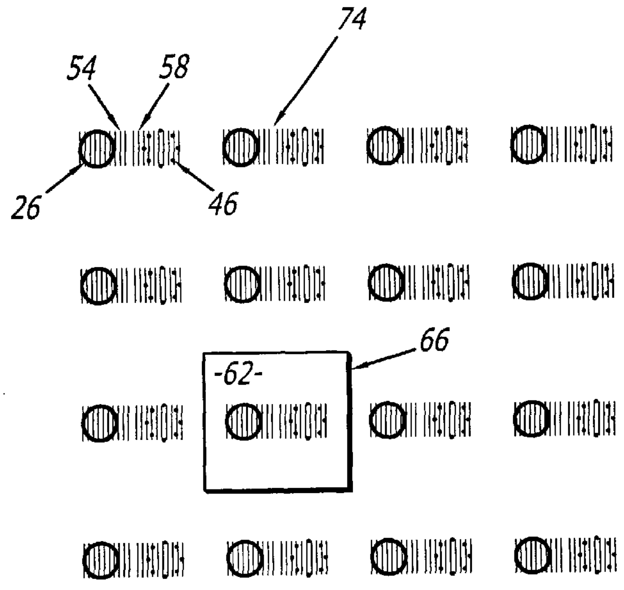
FIG. 2 is a top, cross-sectional view of be illustrative embodiment of the voltage variable metal/dielectric composite structure implemented in accordance with the teachings of the present invention with the top and bottom metal layers and the intermediate VVD layer removed to illustrate the relationship between the metal vias and the metal contacts.

FIG. 2 is a top, cross-sectional view of be illustrative embodiment of the voltage variable metal/dielectric composite structure 10 implemented in accordance with the teachings of the present invention with the top 14 and bottom 50 metal layers and the intermediate VVD layer 30 removed to illustrate the relationship between the metal vias 26, 46 and the metal contacts 54, 58. The structure 10 can be described as square lattice of unit cells 62. The boundary 66 of one cell 62 is shown in FIG. 2. A three-dimensional representation of a single unit cell 52 is shown in FIG. 3.

Figure 3:
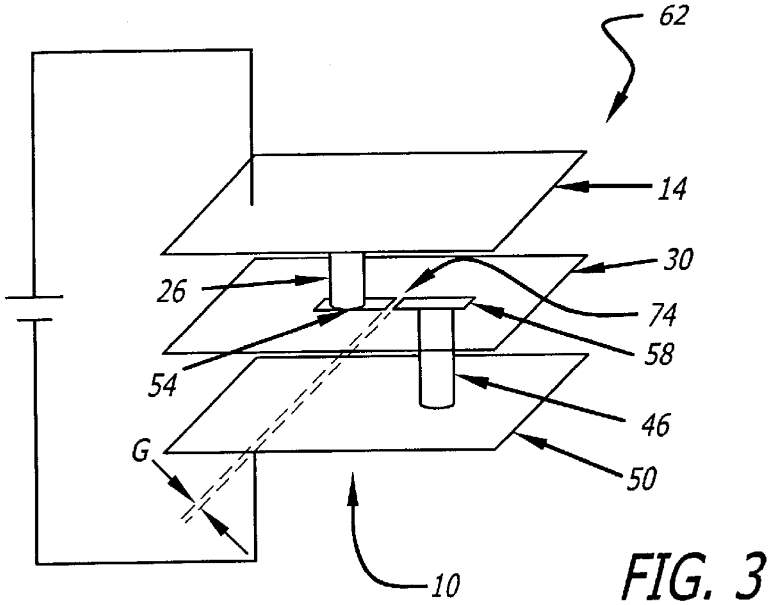
FIG. 3 is a three-dimensional, partial view of a unit cell of the illustrative embodiment of the voltage variable metal/dielectric composite structure implemented in accordance with the teachings of the present invention.

FIG. 3 is a three-dimensional, partial view of a unit cell of the illustrative embodiment of the voltage variable metal/dielectric composite structure implemented in accordance with the teachings of the present invention. The metal 14, 50 and voltage variable dielectric 66, 38 layers are shown, but the low-loss dielectric 22, 42 is omitted for the sake of clarity. The gap G between of the capacitor 74 deposited on the VVD layer 18 defines the tuneable capacitive element of the unit cell 62. The separation G is in the range of 3–30 microns. For typical VVD materials, this separation implies that the DC voltage required to tune the capacitor is in the range of 15 to 150 volts. The invention 10 is tuned by applying a DC voltage across the top 14 and bottom 50 metal layers, as shown in FIGS. 1 and 3.

Figure 4:
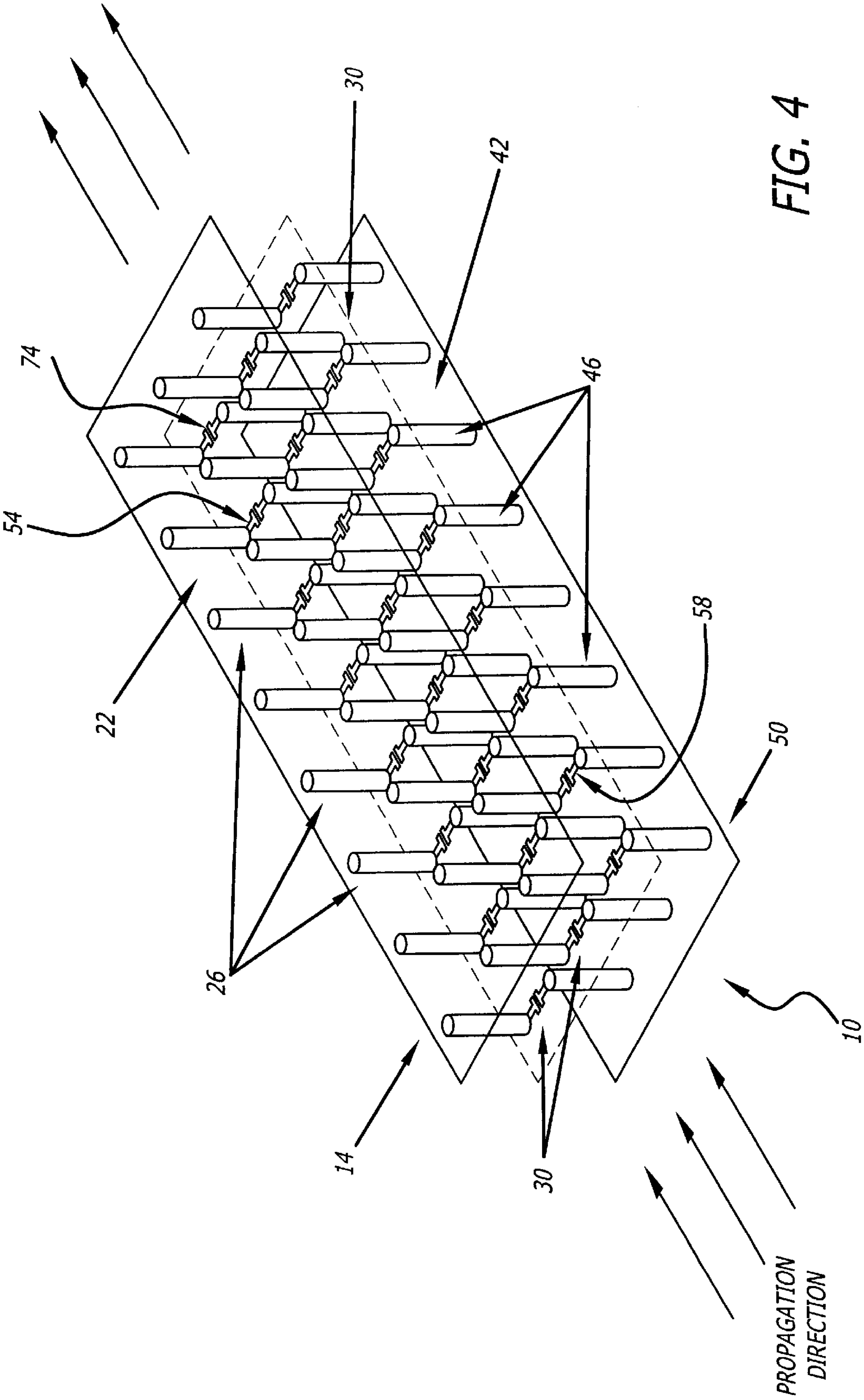
FIG. 4 is a three-dimensional view of the illustrative embodiment of the voltage variable metal/dielectric composite structure implemented in accordance with the teachings of the present invention.

FIG. 4 is a three-dimensional view of the illustrative embodiment of the voltage variable metal/dielectric composite structure implemented in accordance with the teachings of the present invention. The top and bottom electrode layers 14 and 50, respectively, are shown in outline form so that the internal structure is visible. The direction of energy propagation is also indicated on FIG. 4.

Figure 5:
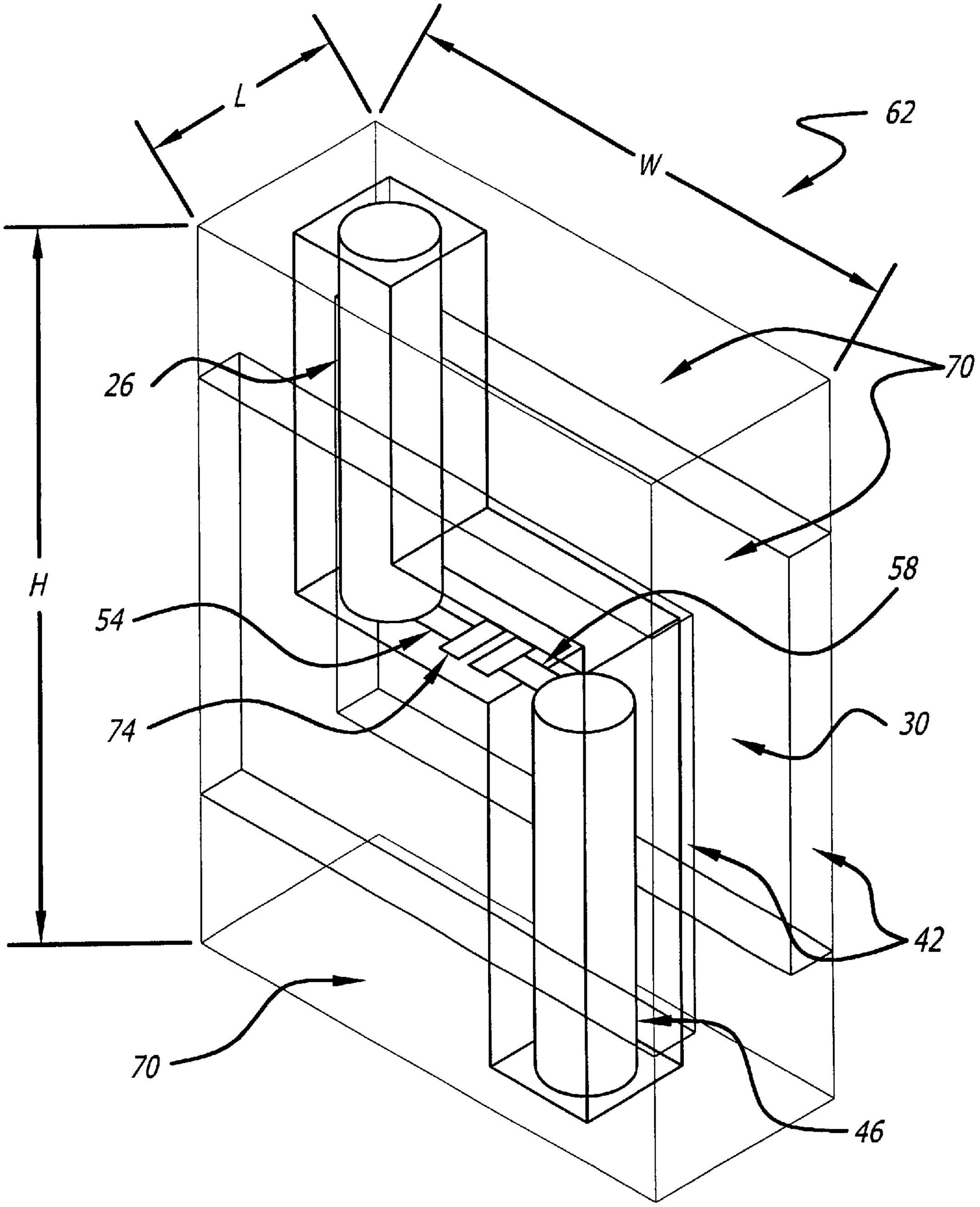
FIG. 5 is a three-dimensional, view of a unit cell of the illustrative embodiment of the voltage variable metal/dielectric composite structure implemented in accordance with the teachings of the present invention.

FIG. 5 is a three-dimensional view of a unit cell 62 of a voltage variable metal/dielectric composite structure 10 implemented in accordance with the teachings of the present invention. In FIG. 5, H=height, L=length and W=width.

Consequently, the unit cell 62 area A=W*L. The unit cell 62 dimensions H, W along the directions transverse to the direction of energy flow, must be small enough so that the structure 10 does not couple to higher-order propagating modes of the waveguide. Dimensions H, W of $\lambda_0/2(\in_{eff})^{1/2}$ or less (dimensions below $\lambda_0/4(\in_{eff})^{1/2}$ are preferable ) are sufficient to achieve this. $\lambda_0$ is the free space wavelength and $\in_{eff}$ is the effective dielectric constant of the full structure 10. Along the propagation direction, the unit cell 62 length L can be much larger: in principle any length can be used. However, as this dimension L is reduced below $\lambda_0/4(\in_{eff})$hu ½, the structure 10 can be design made to more closely mimic the behavior of a homogeneous dielectric material and a large bandwidth can be achieved.

The effective dielectric constant of the structure 10 is given approximately by:

$$\in_{eff}=\in_{substrate}+\text{Cap}*H/A \qquad [1]$$

where $\in_{substrate}$ is the dielectric constant of the substrates 18, 38. If the substrates 18, 38 consist of more than one material or a single material with air gaps 70, then $\in_{substrate}$ is an effective dielectric constant that can be obtained by computer simulations at the frequency range of interest. Cap is the capacitance of the variable capacitor 74 and is given by:

$$\text{Cap}=\in_{VVD}*\text{Wid}*T/G \qquad [2]$$

Figure 6:
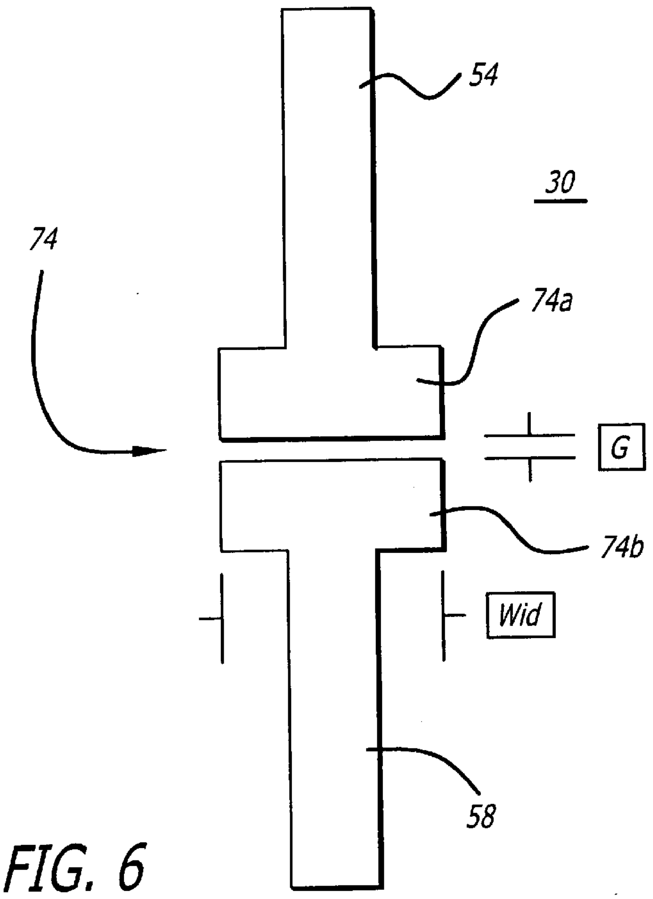
FIG. 6 is an enlarged top view of a capacitor in the third layer utilized in the illustrative embodiment of the present invention.

FIG. 6 is an enlarged view of the capacitor 74 of the third layer 34. $\in_{VVD}$ is the dielectric constant of the voltage variable dielectric film 30. T is the thickness of the VVD film 30. Wid is the width of the two metal plates 74*a*, 74*b*, which define the capacitor 74. G is the separation between the two metal plates 74*a*, 74*b*. To achieve a large tuneability in $\in_{eff}$, Cap*H/A should be made large compared to $\in_{substrate}$. The plates 74*a*, 74*b* connect to contacts 54, 58 as shown on FIG. 6.

Equation [1] ignores the potentially detrimental effects related to the metal vias 26, 46. The first is that the inductance of the vias 26, 46 increases $\in_{eff}$ and makes $\in_{eff}$ frequency dependent. The second is that capacitive coupling between the two vias 26, 46 in the unit cell 62 tends to increase $\in_{eff}$ and reduce the tuneability of $\in_{eff}$. Increasing the diameter of the vias 26, 46 reduces the first effect and increases the second effect. Optimal via 26, 46 diameter can be determined using computer simulations of the full structure. A useful method to mitigate the effect of capacitive coupling is to introduce air gaps 70 in the substrates (regions filled with lower dielectric constant material than the rest of the substrate can also be used). This method is illustrated on FIG. 5.

The general class of materials appropriate for use in this structure is nonlinear dielectrics, of which ferroelectrics are a large class. The preferred dielectric material for microwave applications is barium-strontium-titanate (BST). There are different types of BST depending on the Ba and Sr mole fractions, e.g., $Ba_{0.5}Sr_{0.5}TiO_3$ and $Ba_{0.75}Sr_{0.25}TiO_3$. Each has different electrical properties at room temperature.

Figure 7:
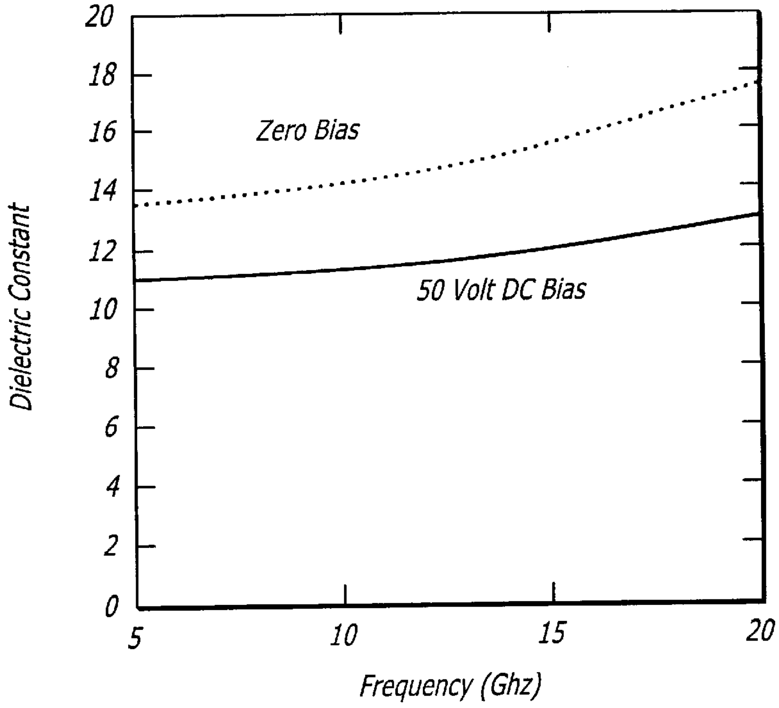
FIG. 7 shows the results of a 3D electromagnetic simulation for a composite structure, which was designed to operate at frequencies near 10 GHz in terms of dielectric constant in accordance with the teachings of the present invention.
Figure 8:
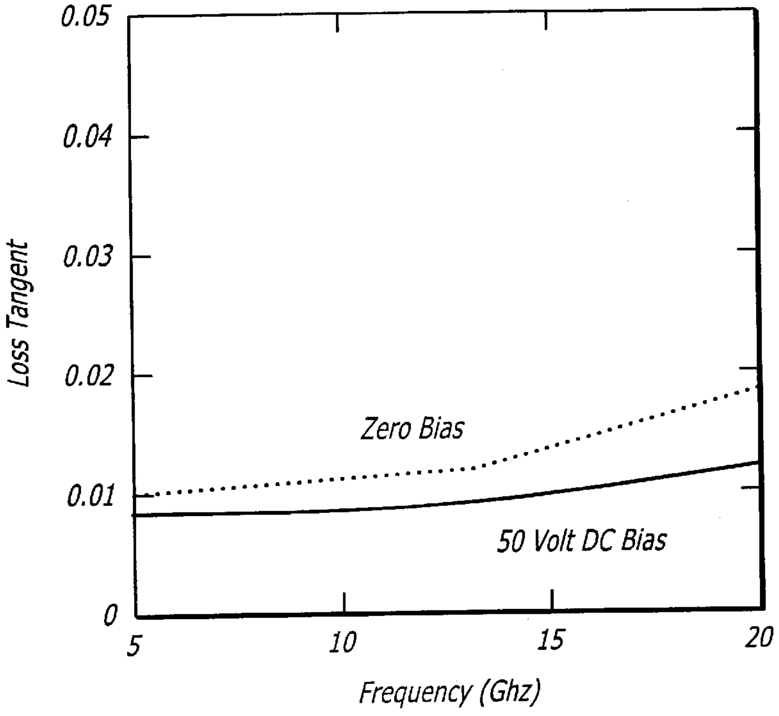
FIG. 8 shows the results of a 3D electromagnetic simulation for a composite structure, which was designed to operate at frequencies near 10 GHz in terms of loss tangent in accordance with the teachings of the present invention.

FIGS. 7 and 8 show the results of a 3D electromagnetic simulation for a composite structure implemented in accordance with the present teachings, which was designed to operate at frequencies near 10 GHz. The results are expressed in terms of dielectric constant and loss tangent for the composite. As can be seen in FIGS. 4 and 5, at 10 GHz the dielectric constant is about 14 when no DC bias is applied, and it is about 11 when a DC bias of 50 Volts is applied. All of the material parameters used in the simulation for the constituent materials are readily realizable. The results indicate that this composite may be used to make a microwave phase shifter that is both broadband and low loss. These results verify that the following criteria can be met: (1) small dielectric constants and (2) voltages needed to tune the material are relatively small.

The invention 10 is preferably produced by first impregnating a low-loss dielectric material 22, 42 with an array of metal vias 26, 46 and coating one surface with a layer of metal 14, 50. Impregnation can be accomplished by well-known micro-machining and insertion techniques. This structure can be cut to produce the second 18 and fifth layers 38. Then the bottom of the second layer 18 is coated with the layer 30 of voltage variable dielectric material followed by the layer 34 of patterned metallic film. Finally the two subassemblies are connected with the layer 30 of voltage variable dielectric in the middle so that said first metal vias 26 connect to the first metal contacts 54 and the second metal vias 46 connect to the second metal contacts 58.

Those familiar with the art to which this invention pertains will appreciate that alternative methods of fabrication can be used to produce the composite structure of this invention 10.

With the metal/dielectric composite of this invention, low dielectric constants (about 10) can be achieved and the necessary bias voltage is only on the order of tens of volts. Furthermore, it should be readily producible with established micro-machining and film deposition techniques.

This new approach will also allow much more design flexibility and make it possible to tailor the material for specific applications. For example the metal/dielectric composite of this invention can be designed to have a much greater effective dielectric tuneability (over a narrow range of frequencies) than the base VVD material. This is currently not believed to be possible with dielectric/dielectric composites.

It is therefore intended by the appended claims to cover any and all such applications, modifications and embodiments within the scope of the present invention.

Accordingly,

What is claimed is:

1. A voltage variable composite structure comprising:

a) a first layer of metal;

b) a second layer of low-loss dielectric material impregnated with an array of first metal vias; said first layer joined-to the top of said second layer;

c) a third layer of a voltage variable dielectric material joined to the bottom of said second layer;

d) a fourth layer of metal capacitors joined to the bottom of said third layer;

e) a fifth layer of low-loss dielectric material impregnated with an array of second metal vias; said fifth layer joined to the bottom of said fourth layer; and f) a sixth layer of metal joined to the bottom of said fifth layer.

2. The invention of claim 1 in which said first layer of metal is selected from the group consisting of copper, gold and silver.

3. The invention of claim 1 in which said voltage variable dielectic material is about 100 to 1000 nm in thickness.

4. The invention of claim 1 in which said voltage variable dielectric material is barium-strontium-titanate.

5. A voltage variable composite structure comprising a square lattice of unit cells of height H, width W and length L, each unit cell comprising:

a) a first layer of metal;

b) a second layer of low-loss dielectric material with a first metal via, traversing the entire thickness of said low-loss dielectric material; said first layer joined to the top of said second layer; said low-loss dielectric material having a dielectric constant $\in_{substrate}$;

c) a third layer of a voltage variable dielectric material joined to the bottom of said second layer; said voltage variable dielectric material having a dielectric constant $\in_{VVD}$ and a thickness T;

d) a fourth layer of a patterned thin metallic film; said patterned thin metallic film comprising a metal capacitor connected to a first metal contact and a second metal contact; said capacitor having a width Wid and a gap G; said fourth layer joined to the bottom of said third layer so that said first metal via is positioned adjacent said first metal contact;

e) a fifth layer of low-loss dielectric material impregnated with a second metal via, traversing the entire thickness of said low-loss dielectric material; said fifth layer joined to the bottom of said fourth layer so that said second metal via contacts said second metal contact; said low-loss dielectric material having a dielectric constant $\in_{substrate}$; and f) a sixth layer of metal joined to the bottom of said fifth layer; the dimensions of said structure being selected to produce an effective dielectric constant $\in_{eff}$ in accordance with the following formulae:

$$\in_{eff}=\in_{substrate}+\text{Cap}*H(W*L)$$

$$\text{Cap}=\in_{VVD}*\text{Wid}*T/G$$

6. The invention of claim 5 in which said first layer of metal is selected form the group consisting of copper, gold and silver.

7. The invention of claim 5 in which said voltage variable dielectric material is about 100 to 1000 nm in thickness.

8. The invention of claim 5 in which said voltage variable dielectric material is barium-strontium-titanate.

9. The invention of claim 1 in which said first metal via is selected from the group consisting of copper, gold and silver.

10. The invention of claim 1 in which said fourth layer of patterned thin metallic film is selected from the group consisting of copper, gold and silver.

11. The invention of claim 1 in which said second metal via is selected from the group consisting of copper, gold and silver.

12. The invention of claim 1 in which said sixth layer of metal is selected from the group consisting of copper, gold and silver.

13. A The invention of claim 5 in which said first metal via is selected from the group consisting of copper, gold and silver.

14. The invention of claim 5 in which said fourth layer of patterned thin metallic film is selected from the group consisting of copper, gold and silver.

15. The invention of claim 5 in which said second metal via is selected from the group consisting of copper, gold and silver.

16. The invention of claim 5 in which said sixth layer of metal is selected from the group consisting of copper, gold and silver.

* * * * *